(12) United States Patent
Swarovski

(10) Patent No.: US 6,657,784 B2
(45) Date of Patent: Dec. 2, 2003

(54) SIGHTING DEVICE FOR INCLINED TELESCOPE

(75) Inventor: Gerhard Swarovski, Watten (AT)

(73) Assignee: Swarovski Optik K.G., Absam/Tirol (AT)

( * ) Notice: Subject to any disclaimer, the term of this patent is extended or adjusted under 35 U.S.C. 154(b) by 0 days.

(21) Appl. No.: 10/217,166

(22) Filed: Aug. 13, 2002

(65) Prior Publication Data

US 2003/0053205 A1 Mar. 20, 2003

(30) Foreign Application Priority Data

Aug. 14, 2001 (DE) .......................................... 101 39 806

(51) Int. Cl.$^7$ .............................................. G02B 23/00
(52) U.S. Cl. ...................... 359/399; 359/407; 359/433
(58) Field of Search .................... 359/399, 407, 359/419, 424, 428, 433; 42/119, 120

(56) References Cited

U.S. PATENT DOCUMENTS

| | | | | |
|---|---|---|---|---|
| 1,016,606 A | * | 2/1912 | Berger | ......................... 359/428 |
| 2,420,252 A | | 5/1947 | Land | |
| 3,230,627 A | | 1/1966 | Rickert et al. | |
| 4,248,496 A | | 2/1981 | Akin et al. | |
| 4,469,833 A | * | 9/1984 | Mark | ......................... 524/161 |
| 4,799,325 A | | 1/1989 | Booze | |
| 5,321,547 A | * | 6/1994 | Zapp | ......................... 359/431 |
| 5,365,670 A | * | 11/1994 | Klimochko | .................. 42/119 |
| 6,381,067 B1 | * | 4/2002 | Wang | ......................... 359/407 |

FOREIGN PATENT DOCUMENTS

| | | |
|---|---|---|
| CH | 386 721 | 4/1965 |
| CH | 649 390 A5 | 5/1985 |
| CH | 6 63 097 A5 | 11/1987 |
| DE | 1 578 271 | 9/1971 |
| DE | 34 43 3232 C1 | 11/1985 |
| DE | 38 38 621 C1 | 11/1989 |
| DE | 42 19 299 A1 | 12/1993 |
| DE | 296 04 337 U1 | 7/1996 |
| DE | 196 53 784 A1 | 6/1998 |
| EP | 0 124 631 | 5/1983 |
| GB | 2 231 680 A | 11/1990 |
| WO | WO 91/14194 | 9/1991 |
| WO | WO 96 26 415 | 8/1996 |

OTHER PUBLICATIONS

Dr. Ing. Dietrich Spangenberg, *Betrachtungen Uber Offene Visierungen:Kimme + Korn*, Deutsches Waffen Journal, 1971, vol. 12, pp. 1146–1151.

* cited by examiner

*Primary Examiner*—Mark A. Robinson
(74) *Attorney, Agent, or Firm*—Fulbright & Jaworski, LLP

(57) ABSTRACT

A telescope (1) with inclined viewing relative to the axis of sight (2) has a sighting device (4) with a mounting (8) that is adapted to be inserted in or removed from a recess (9) on the telescope housing (6) at an inclined portion (5) such that the sighting device (4) is disposed on the side adjacent the eyepiece (3).

12 Claims, 1 Drawing Sheet

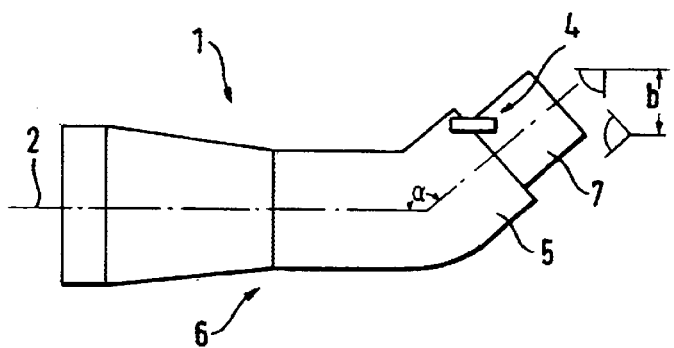
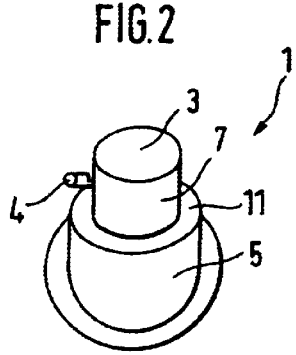
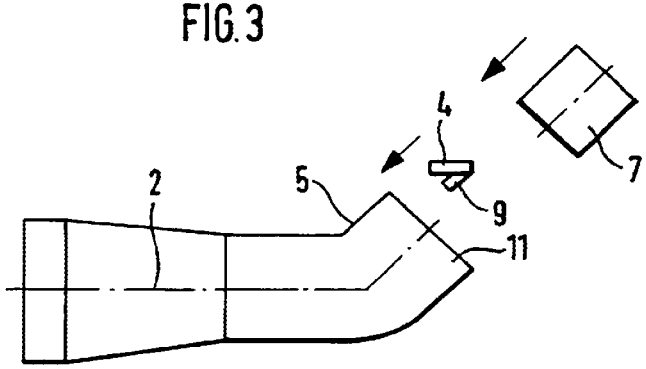
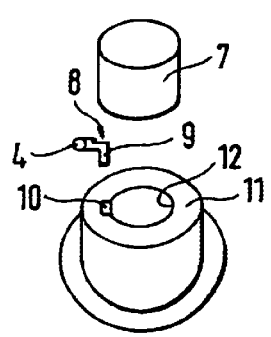
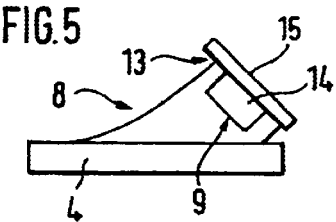
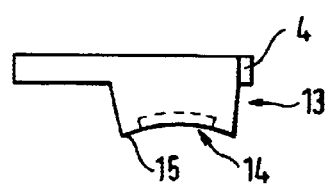

SIGHTING DEVICE FOR INCLINED TELESCOPE

BACKGROUND OF THE INVENTION

1. Field of the Invention

The present invention relates to a sighting device for telescopes having inclined viewing. More particularly, the present invention relates to providing telescopes having inclined optic axes, i.e. inclined axes of sight, with sighting devices fastened to telescope housings for aiming the telescopes.

2. Description of the Related Technology

Since telescopes have small fields of vision, i.e., fields of view, particularly at high magnification, some users have difficulties aiming telescopes to view objects visible with the naked eye.

WO 96/26415 discloses a telescope with inclined viewing wherein a frame-shaped sighting device fastened to a portion of the telescope housing is provided above the eyepiece. For many users, who have no problems bringing objects within the fields of view of a telescope, having a sighting device on the telescope is only bothersome. Also, finding objects with known sighting devices leaves things to be desired.

SUMMARY OF THE INVENTION

An object of the invention is to provide a sighting device that makes it substantially easier to find objects to be viewed with the telescope by users who have problems aiming telescopes.

A further object of the invention is to provide a sighting device that can readily be removed from telescope housings by users without such problems.

In the inventive telescope, the sighting device of the invention is formed for easy insertion on and removal from the telescope housing. The user can thus mount and use the sighting device or remove it from the telescope housing at will. The sighting device is preferably mounted to be disposed adjacent and beside the eyepiece tube.

The sighting device of the invention has a line of sight parallel to the portion of the axis of sight of the telescope for viewing distant objects. The sight can be formed for example by a notch and bead, or as a strip or tube parallel to the portion of the telescope axis of sight for viewing distant objects. The sighting length can be for example 2 to 10 centimeters. If the sighting device used is a tube or optionally two spaced-apart rings, the interior diameters for example, can be 2 to 5 millimeters. Likewise, the sighting device can be formed by an optical aiming device, i.e. a telescopic finder with lower magnification than the primary telescope and a large field of vision.

The sighting device of the invention can be used for monocular or binocular telescopes.

A recess for inserting a mounting projection from the sighting device is preferably provided on the side, i.e. on the right or left, of the telescope housing. The mounting is preferably made along the inclined portion of the telescope housing. Since the sighting device is disposed on the side of the telescope housing, the mounting projection can be of a short and stable form. Further, the recess into which the mounting projection is inserted is preferably provided from a front wall portion of the inclined housing, i.e. the front wall surrounding the opening into which an eyepiece tube is inserted. It is also possible to provide a recess for inserting the sighting device mounting projection on the eyepiece tube.

It is especially preferred to provide the recess for inserting the sighting device mounting projection between the inclined housing portion and an eyepiece tube, such that the recess extends as a groove from the front wall along the inside of the inclined housing portion. Such a groove for the recess is easily produced.

To improve fixations for the mounting of the sighting devices, the mountings preferably have a bearing surface portion along the mounting projection for the sighting device that extends over the front wall of the inclined housing portion when the mounting projection has been inserted into the recess. Additionally, it is advantageous to provide the mounting projection with a concave surface on the side facing the eyepiece tube so that this portion of the mounting projection lies against the eyepiece tube.

The sighting device and the mounting projection are preferably formed integrally, in particular as a plastic part. For example, they can be an injection molded part.

BRIEF DESCRIPTION OF THE DRAWINGS

In the following enabling disclosure, the inventive telescope will be described with reference to the enclosed drawings, wherein:

FIG. 1 shows a side view of a telescope with a mounted embodiment for a sighting device of the invention;

FIG. 2 shows a back end view of an inclined section of the telescope shown in FIG. 1 with an embodiment for the sighting device of the invention mounted adjacent an eyepiece;

FIG. 3 shows an exploded side view of the eyepiece, the embodiment of the sighting device of the invention, and the telescope shown in FIG. 1.

FIG. 4 shows an exploded back end view of the eyepiece, the embodiment of the sighting device of the invention, and the inclined portion of the telescope shown in FIG. 1;

FIG. 5 shows a side view of an embodiment for a sighting device with mounting; and, FIG. 6 shows a top view for the embodiment of the sighting device with bearing surface shown in FIG. 5.

DETAILED DESCRIPTION

Referring to FIGS. 1 and 3, a telescope 1 having an eyepiece 3 inclined at an angle $\alpha$ to axis of sight 2 for inclined viewing is shown.

It is difficult to find objects visible with the naked eye with telescope 1 because telescopes have reduced fields of vision, particularly at high magnification. Telescope 1 according to the invention has sighting device 4 to find objects visible with the naked eye and aim telescope 1 to view such objects. Sighting device 4 is easily inserted on and removed from telescope 1.

Sighting device 4 is formed by a tube with a length of about 4 centimeters and an interior diameter of about 3 millimeters that is extended parallel to axis of sight 2 when sighting device 4 is mounted on telescope 1.

Sighting device 4 is disposed on the side of an inclined portion 5 of telescope housing 6, or is disposed on tube 7 of eyepiece 3. This results in a small and convenient distance b (see FIG. 1) between the viewing position into sighting device 4 and the viewing position into eyepiece 3 of telescope 1.

Sighting device 4 has mounting 8 provided with projection 9 (see FIG. 4). Projection 9 is inserted into recess 10 provided from front wall 11 of telescope housing 6, i.e. front wall 11 on inclined portion 5 which extends around opening 12 into which eyepiece tube 7 is inserted. Recess 10 extends from front wall 11 in the form of a groove along the side of inclined housing portion 5, and projection 9 of sighting device 4 can be inserted into recess 10 to fasten projection 9 between inclined housing portion 5 and eyepiece tube 7. Alternatively, projection 9 can be readily removed from recess 10 to remove sighting device 4 from telescope 1.

Sighting device 4 and mounting 8 with projection 9 preferably consist of one part, in particular a plastic part. This plastic part can be made by injection molding.

Referring to FIGS. 4 and 5, the mounting 8 is shown between projection 9 and sighting device 4 so that bearing surface 13 rests on front wall 11 of inclined housing portion 5 when projection 9 is inserted into recess 10. Furthermore, a wall portion of projection 9 lies against eyepiece tube 7, and is of concave form on the side 14 facing eyepiece tube 7, as shown by dashed lines in FIG. 6. Likewise, bearing surface 13 has on frontal area 15 facing eyepiece tube 7 with a concave recess to rest against eyepiece tube 7.

What is claimed is:

1. A sight for a telescope with inclined viewing, said telescope having an eyepiece disposed into an inclined housing portion, comprising:

a mounting for said sight, said mounting having a projection disposed to be inserted in and removed from a recess included into said inclined housing portion of said telescope to position and retain said sight adjacent said eyepiece, with said sight aligned to be parallel to an optic axis of said telescope along which objects are viewed by said telescope.

2. A sight for a telescope according to claim 1, wherein said sight includes a tube aligned parallel to said optic axis so that objects viewed through said tube can be viewed with said telescope.

3. A sight for a telescope according to claim 1, wherein said sight is an optical aiming device having lower magnification than said telescope so that objects viewed through said optical aiming device can be viewed with said telescope.

4. A sight for a telescope according to claim 1, wherein said sight includes a notch and bead aligned parallel to said optic axis so that objects viewed over and adjacent said notch and bead can be viewed with said telescope.

5. A sight for a telescope according to claim 1, wherein said recess is provided from a front wall of said inclined housing portion, said eyepiece extends into said inclined housing portion from said front wall.

6. A sight for a telescope according to claim 5, wherein a portion of a wall of said eyepiece when positioned in said inclined housing portion provides a wall of said recess.

7. A sight for a telescope according to claim 5, comprising a bearing surface disposed between said mounting and said projection such that said bearing surface rests on said front wall of said inclined housing portion when said projection of said sight is inserted into said recess.

8. A sight for a telescope according to claim 7, wherein said bearing surface has a concave frontal area disposed to be adjacent a wall of said eyepiece when said projection and said wall of said eyepiece are positioned into said inclined housing portion.

9. A sight for a telescope according to claim 1, wherein said projection includes a concave wall disposed to be adjacent a wall of said eyepiece when said projection and said wall of said eyepiece are positioned into said inclined housing portion.

10. A sight for a telescope according to claim 1, wherein said sight and said mounting are formed as an integral unitary structure.

11. A sight for a telescope according to claim 10, wherein said unitary sight and mounting are made of plastic.

12. A sight for a binocular with inclined viewing having at least one eyepiece disposed into an inclined housing portion, comprising;

a mounting for said sight, said mounting having a projection disposed to be inserted in and removed from a recess included into said inclined housing portion of said binocular to position and retain said sight adjacent said eyepiece, with said sight aligned to be parallel to an optic axis of said binocular along which objects are viewed by said binocular.

* * * * *